United States Patent Office 3,636,033
Patented Jan. 18, 1972

1

3,636,033
ADDITION PRODUCT OF AN α,β-UNSATURATED ESTER AND A THIOCARBOXYLIC ACID
Eduard K. Kleiner, New York, N.Y., assignor to Geigy Chemical Corporation, Greenburgh, N.Y.
No Drawing. Filed Feb. 27, 1969, Ser. No. 803,115
Int. Cl. C07c 153/07
U.S. Cl. 260—455 C
14 Claims

ABSTRACT OF THE DISCLOSURE

Organic materials, particularly synthetic polymers such as polypropylene, are protected against oxidation in air, thermal degradation or deterioration by including, in such substances, a stabilizing amount of an antioxidant. The antioxidant is obtained by reacting (a) an α,β-unsaturated ester of a hindered hydroquinone and (b) a thio acid.

The present invention is concerned with novel compounds which are useful as antioxidants for organic materials and particularly, as antioxidants for synthetic polymers such as, for example, polypropylene, polyethylene, polyester, polystyrene, polyvinyl chloride, nylon and other polyamides, cellulosics, polyacetals, polyurethanes, petroleum and wood resins, mineral oils, animal and vegetable fats, waxes, rubbers such as styrene-butadiene rubber (SBR), acrylonitrile-butadiene-styrene rubber (ABS), olefin-copolymers, ethylene - vinyl - acetate copolymers, polycarbonates, polyacrylonitrile, poly (4-methyl pentene-1) polymers, polyoxymethylenes, and the like. The present invention also relates to a novel procedure for preparing the aforesaid novel antioxidants and to stabilized compositions containing said novel antioxidants.

The prevention of oxidation of various organic materials is obviously of primary industrial concern and therefore, antioxidants are used in or added to a wide variety of commercial products such as synthetic polymers of the type indicated supra, oils, plastic materials, etc., which are normally subject to oxidative deterioration.

The novel antioxidants of the present invention are represented by the following formulae:

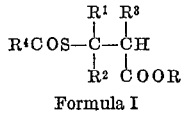
Formula I

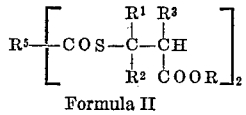
Formula II wherein —R is

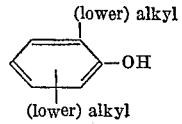

—R¹, —R², —R³ are each hydrogen, lower alkyl, aryl, aralkyl or —C$_m$H$_{2m}$COOR, where $m$ is 0 to 6
—R⁴ is straight or branched alkyl, aryl, aralkyl or R
—R⁵ is —C$_n$H$_{2n}$—wherein $n$ is 0 to 12 or —C$_6$H$_4$—(ortho, meta or para phenylene)

As used herein, alkyl covers straight, branched and cyclic alkyl groups having from 1 to 24 carbon atoms and preferably to 12 carbon atoms; lower alkyl covers groups containing from 1 to 6 carbon atoms. Illustrative examples of such groups are methyl, ethyl, isopropyl, n-butyl, t-

2 butyl, n-hexyl, n-octyl, n-decyl, n-dodecyl, n-hexadecyl, n-eicosyl, n-tetracosyl and the various branched chain isomers thereof. Aryl and aralkyl include phenyl, naphthyl and alkyl substituted phenyl or naphthyl groups having up to 24 carbon atoms. Illustrative examples are benzyl, phenylethyl, 2,4 - dibutylphenyl, 2,4,6 - trihexylphenyl, 6-phenylnaphthyl, 2-naphthylethyl, 2-naphthylhexyl and the like. In addition, aryl and aralkyl can also be substituted by a halogen, alkoxy, hydroxyl, alkylthio or arylthio group. Illustrative examples of such groups are 4-chlorophenyl, 4-bromobenzyl, 2-(4-chloronaphthyl), 4-ethoxyphenyl, 2 - (4 - methoxynaphthyl), 4-hydroxy-3-methylphenyl, ethylthiophenyl, 4-butylthiophenyl, 3-hydroxy-4-ethylthiophenyl, 2-(4-ethylthionaphthyl), and the like. A preferred aralkyl group is benzyl. Where R¹, R², and R³ is —C$_m$H$_{2m}$COOR, $m$ can be 0 to 6 but preferably 0 or 1.

Illustrative examples of alkylene groups having 1 to 12 carbon atoms are methylene, tetramethylene, hexamethylene, dodecamethylene, ethylene and the like.

The novel antioxidants of the present invention are addition products of (a) an α,β-unsaturated ester of a hindered hydroquinone of the formula

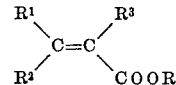

and (b) a thio acid of the Formula R⁴COSH or HSCO—R⁵—COSH, wherein R, R¹, R², R³, R⁴ and R⁵ are as described above. Instead of the free thio acids, their salts, such as the sodium or potassium salts can also be used.

The addition reaction involving the α,β-unsaturated ester and a thio acid is accomplished by simply reacting the two reactants, preferably in an inert solvent, at elevated temperatures from 30 to 120° C. from 30 minutes to 48 hours. If the free thio acids are used in the addition reaction the conversion can be accelerated by the addition of catalytic amounts of a base such as sodium or potassium methoxide or ethoxide, piperidine or benzyltrimethyl-ammonium hydroxide. It is also possible to catalyze the addition reaction by the use of a free-radical initiator such as an azo compound and particularly an azonitrile compound or an aliphatic peroxide of the type described in applicant's copending application entitled Polymeric Antioxidants, Ser. No. 738,770, filed June 21, 1968. The free-radical initiators, however, can be used only if the α,β-unsaturated esters of a hindered hydroquinone shows little or no tendency toward the free-radication polymerization.

The addition reaction of α,β-unsaturated esters and thio acids as such is well known and described in "Houben-Weyl, Methoden der Organischen Chemie," vol. IX, pages 750–752 (Georgy Thieme Verlag, Stuttgart, 1955) and in "Reactions of the Acrylic Esters" by E. H. Riddle, page 149 (Reinhold Publishing Corp., New York, 1954).

The novel antioxidants of this invention were prepared by using the following procedure:

Equimolar amounts of the α,β-unsaturated ester and the thio acid were dissolved in three times the amount of chloroform and sealed in a reaction vessel under nitrogen. The vessel is kept from 12 to 24 hours at 80° C. depending on the degree of conversion which was checked by thin layer chromatography. After completion of the reaction, the solvent is evaporated and the crude product is purified by recrystallization from hexane, heptane or benzene, and identified by infrared spectroscopy, nuclear magnetic resonance and elemental analysis as indicated in Table I. Yields are high, that is, higher than 75%.

Illustrative α,β-unsaturated esters used in preparing the desired antioxidants of the present invention as indicated above, are represented by the following formula:

$$\underset{R^2}{\overset{R^1}{\diagdown}}C=C\underset{COOR}{\overset{R^3}{\diagup}}$$

wherein R is

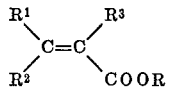

and R¹, R² and R³ are as defined above.

Examples of such esters are:

| Esters of— | R¹ | R² | R³ |
|---|---|---|---|
| Acrylic acid | —H | —H | —H |
| Methacrylic acid | —H | —H | —CH₃ |
| Crotonic acid | —CH₃ | —H | —H |
| Cinnamic acid | —C₆H₅ | —H | —H |
| Fumaric acid | —COOR | —H | —H |
| Maleic acid | —H | —COOR | —H |
| Mesaconic acid | —COOR | —H | —CH₃ |
| Citraconic acid | —H | —COOR | —CH₃ |
| Itaconic acid | —H | —H | —CH₂COOR |
| Aconitic acid | —COOR | —H | —CH₂COOR |

The preferred α,β-unsaturated esters are esters of acrylic acid, fumaric and itaconic acid.

Preferred thio acids used in preparing the antioxidant of the present invention are aliphatic thio acids containing from 2 to 18 carbon atoms, aliphatic dithio acids containing from 2 to 10 carbon atoms, aromatic thio acids such as thiobenzoic acid or dithioterephthalic acid, aralkyl thio acids such as diphenylthioacetic acid and the like.

Some of the preferred starting α,β-unsaturated ester compounds used in preparing the antioxidant compounds of the present invention are as follows:

(a) 3,5-di-tert-butyl-4-hydroxyphenyl acrylate $$CH_2=CH—COOR_0$$

(b) Bis(3,5-di-tert-butyl-4-hydroxyphenyl)fumarate

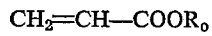

(c) Bis(3,5-di-tert-butyl-4-hydroxyphenyl)itaconate $$CH_2=C—COOR_0$$
$$\phantom{CH_2=}CH_2—COCR_0$$

wherein R₀ is

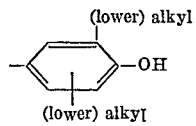

The aforesaid α,β-unsaturated esters (identified above as compounds (a), (b) and (c) are reacted with the following thio acids:

| (d) Thioacetic acid | CH₃COSH |
| (e) Thiopropionic acid | CH₃CH₂COSH |
| (f) Thiobenzoic acid | C₆H₅COSH |
| (g) Diphenylthioacetic acid | (C₆H₅)₂CHCOSH |

(h) Dithioterephthalic acid 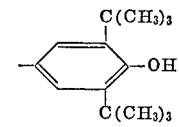

Table I below contains illustrative examples of the antioxidants of this invention with their properties and most of them with elemental analysis. These antioxidants have been prepared by the addition of the thio acids to the α,β-unsaturated esters according to the general procedure described above.

TABLE I.—PROPERTIES AND ANALYSIS OF NOVEL ANTIOXIDANTS

| Appearance | Crystallized from— | Melting point, °C. | Calcd. C | Calcd. H | Calcd. S | Found C | Found H | Found S | Starting materials | Product | |
|---|---|---|---|---|---|---|---|---|---|---|---|
| White crystals | Heptane | 107.5-109 | 64.74 | 8.01 | 9.09 | 64.77 | 7.89 | 9.02 | (a)+(d) | 3,5-di-tert-butyl-4-hydroxyphenyl 3-(acetylthio)propionate. R₀OCOCH₂CH₂SCOCH₃ | (A) |
| Do | Hexane | 100-102 | 73.77 | 7.19 | 6.35 | 73.89 | 7.27 | 6.29 | (a)+(g) | 3,5-di-tert-butyl-4-hydroxyphenyl 3-(diphenylacetylthio)propionate. R₀OCOCH₂CH₂SCOCH(C₆H₅)₂ | (B) |
| White flakes | Heptane | 65.5-66.5 | | | | | | | (b)+(d) | Bis(3,5-di-tert-butyl-4-hydroxyphenyl) 2-(acetylthio)succinate. R₀OCOCHSCOCH₃ / R₀OCOCH₂ | (C) |
| Do | Hexane | 63-65 | 68.37 | 8.20 | 5.21 | 68.83 | 8.48 | 5.21 | (b)+(e) | Bis(3-5-di-tert-butyl-4-hydroxyphenyl) 2-(propionylthio)succinate. R₀OCOCHSCOCH₂CH₃ / R₀OCOCH₂ | (D) |
| White crystals | Hexane | 55-56 | | | | | | | (c)+(e) | Bis(3,5-di-tert-butyl-4-hydroxyphenyl) 2-(propionylthiomethyl)succinate. R₀OCOCHCH₂SCOCH₂CH₃ / R₀OCOCH₂ | (E) |
| White flakes | Heptane | (¹) | 70.66 | 7.60 | 4.83 | 71.09 | 7.79 | 4.79 | (b)+(f) | Bis(3,5-di-tert-butyl-4-hydroxyphenyl) 2-(benzoylthio)succinate. R₀OCOCHSCOC₆H₅ / R₀OCOCH₂ | (F) |
| Do | Hexane | (²) | 70.97 | 7.74 | 4.74 | 70.67 | 7.87 | 4.38 | (c)+(f) | Bis(3,5-di-tert-butyl-4-hydroxphenyl) 2-(benzoylthiomethyl)succinate. R₀OCOCHCH₂SCOC₆H₅ / R₀OCOCH₂ | (G) |

TABLE I.—Continued

| Appearance | Crystallized from— | Melting point, °C. | Elemental analysis | | | | | | Starting materials | Product | |
|---|---|---|---|---|---|---|---|---|---|---|---|
| | | | Calcd. | | | Found | | | | | |
| | | | C | H | S | C | H | S | | | |
| White crystals | Heptane/benzene | 165–166.5 | 67.17 | 7.25 | 8.54 | 67.61 | 7.04 | 8.50 | (a)+(h) | Bis(3,5-di-tert-butyl-4-hydroxyphenyl) 3,3′-(terephthaloylthio)dipropionate. $(R_0OCOCH_2CH_2SCO)_2$—⟨◯⟩— | (H) |
| Do | Hexane | 72–74 | 73.37 | 7.50 | 4.26 | 73.79 | 7.50 | 4.12 | (b)+(g) | Bis(3,5-di-tert-butyl-4-hydroxyphenyl) 2-(diphenylacetylthio)succinate. $R_0OCOCHSCOCH(C_6H_5)_2$ $R_0OCOCH_2$ | (I) |
| White powder | Heptane/benzene | (³) | | | | | | | (b)+(h) | Tetrakis(3,5-di-tert-butyl-4-hydroxyphenyl) 2,2′-(terephthaloylthio)-disuccinate. $\left(\begin{array}{c}R_0OCOCHSCO\\R_0OCOCH_2\end{array}\right)_2$—⟨◯⟩— | (J) |
| Do | do | 185–187 | 69.67 | 7.74 | 5.03 | 69.76 | 7.66 | 5.02 | (c)+(h) | Tetrakis(3,5-di-tert-butyl-4-hydroxyphenyl) 2,2′-(terephthaloylthiomethyl)-disuccinate. $\left(\begin{array}{c}R_0OCOCHCH_2SCO\\R_0OCOCH_2\end{array}\right)_2$—⟨◯⟩— | (K) |

¹ 63° (sinters). ² 66° (sinters). ³ Sinters>110°.

NOTE.—In the above formula $R_0$ is as defined supra.

Additional examples of novel antioxidants represented by Formulae I and II are listed in Table II. These antioxidants are prepared according to the procedure described supra. All thio acids listed in Table II are either commercially available or are prepared as described in Houben-Weyl, Methoden der Organischen Chemie, vol. IV, pages 745–747 (Georg Thieme Verlag, Stuttgart, 1955). The synthesis of all α,β-unsaturated esters containing hindered phenolic groups is described in my copending application Ser. No. 738,770, filed June 21, 1968.

One general method for preparing said unsaturated esters comprises reacting an alcohol dissolved in pyridine with an acid chloride. For example, 2,6-di-t-butylhydroquinone and acrylyl chloride yield 3,5-di-t-butyl-4-hydroxyphenyl acrylate; 2,6-di-t-butylhydroquinone and methacrylyl chloride yield 3,5-di-t-butyl-4-hydroxyphenyl methacrylate; 2,6-di-t-butylhydroquinone and fumaryl chloride yield bis(3,5-t-butyl-4-hydroxyphenyl)fumarate; 2,6-di-t-butylhydroquinone and itaconyl chloride yield bis(3,5-di-t-butyl-4-hydroxyphenyl)itaconate.

TABLE II

| Antiox. type | Thio acids | α,β-Unsaturated esters | Novel antioxidants | |
|---|---|---|---|---|
| I | $CH_3(CH_2)_3COSH$ | $+\ ($⟨=CHCOOR_0$)_2$, trans | $R_0OCOCHSCO(CH_2)_3CH_3$ $R_0OCOCH_2$ | (L) |
| | $CH_2(CH_2COSH$ | $+\ CH_2=CCOOR_0$ $\ \ \ \ \ \ \ \ CH_2COOR_0$ | $R_0OCOCHCH_2SCO(CH_2)_7CH_3$ $R_0OCOCH_2$ | (M) |
| | $CH_3(CH_2)_{11}COSH$ | $+\ CH_2=CHCOOR_0$ | $R_0OCOCH_2CH_2SCO(CH_2)_{11}CH_3$ | (N) |
| | ⟨◯⟩—$CH_2COSH$ | $+\ ($⟨=CHCOOR_0$)_2$, trans | $R_0OCOCHSCOCH_2$—⟨◯⟩ $R_0OCOCH_2$ | (O) |
| | ⟨◯⟩—S—⟨◯⟩—COSH | $+\ ($⟨=CHCOOR_0$)_2$, trans | $R_0OCOCHSCO$—⟨◯⟩—S—⟨◯⟩ $R_0OCOCH_2$ | (P) |
| | $CH_3O$—⟨◯⟩—COSH | $+\ ($⟨=CHCOOR_0$)_2$, trans | $R_0OCOCHSCO$—⟨◯⟩—$OCH_3$ $R_0OCOCH_2$ | (Q) |
| | ⟨◯◯⟩—COSH | $CH_2=CHCOOR_0$ | $R_0OCOCH_2CH_2SCO$—⟨◯◯⟩ | (R) |
| II | —(COSH)₂ | $+\ 2\ CH_2=CCOOR_0$ $\ \ \ \ \ \ \ \ \ \ \ CH_2COOR_0$ | $\left[\begin{array}{c}R_0OCOCHCH_2SCO\\R_0OCOCH_2\end{array}\right]_2$ | (S) |
| | —(CH₂COSH)₂ | $+\ 2$⟨=CHCOOR_0$)_2$, trans | $\left[\begin{array}{c}R_0OCOCHSCOCH_2\\R_0OCOCH_2\end{array}\right]_2$ | (T) |
| | —(CH₂CH₂COSH)₂ | $+\ 2\ CHS=C(CH_3)COOR_0$ | $\left[R_0OCOCH(CH_3)CH_2SCOCH_2CH_2\right]_2$ | (U) |

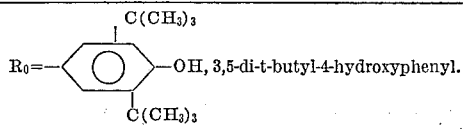

$R_0=$ 3,5-di-t-butyl-4-hydroxyphenyl.

The oxidation of most polymers is so slow at ambient temperatures, even in the absence of antioxidants, that testing of the effects of antioxidants must necessarily be conducted at high temperatures in order to yield results within a convenient period of time. The tests conducted on the materials listed in the following Tables III and IV were conducted either in a tubular oven with an airflow of 400 cubic feet per minute at an oven temperature of 150° C. or a rotary oven with 4 r.p.m. at an oven temperature of 150° C. The oven aging is expressed in hours.

In preparing the sample for testing, unstabilized polypropylene powder is thoroughly blended with the indicated antioxidant. The blended material is thereafter milled on a two-roller mill at a temperature of 182° C. for six minutes after which time the stabilized polypropylene is sheeted from the mill and allowed to cool. The milled polypropylene sheet which has been stabilized is then cut into small pieces and pressed for seven minutes on a hydraulic press at 218° C. and 174 p.s.i. pressure. The resultant sheet of 25 mil thickness is then tested for resistance to accelerated ageing in the above described tubular oven. In Table II and IV are reported the results of the oven ageing tests in which the antioxodants of this invention were added to polypropylene together with the indicated ultraviolet light absorber and the synergist.

TABLE III

Evaluation of novel antioxidants in polypropylene (25 mil), tubular oven, 150° C.

| Product | Hours to fail | |
|---|---|---|
| | 0.25% antioxidant plus 0.5% UV-2 | 0.1% antioxidant plus 0.5% UV-2 [1] plus 0.3% DSTDP [2] |
| E | 160 | 430 |
| F | 380 | 720 |

[1] UV-2, and ultraviolet absorber, 2-(3',5'-di-tert-butyl-2'-hydroxyphenyl)-5-chlorobenzotriazole.
[2] DSTDP=distearylthiodipropionate, commercial synergist for antioxidants.
Note.—Unstabilized 3 hours.

TABLE IV

Evaluation of novel antioxidants in polypropylene (25 mil), rotary oven, 150° C.

| Product | Hours to fail | |
|---|---|---|
| | 0.25% antioxidant plus 0.5% UV-2 | 0.1% antioxidant plus 0.5% UV-2 plus 0.3% DSTDP |
| A | 10 | 10 |
| B | 55 | 210 |
| C | 160 | 390 |
| D | 190 | 540 |
| G | 290 | 1,450 |
| H | 305 | 1,350 |
| I | 550 | 1,640 |
| J | 480 | 1,030 |
| K | 470 | 1,030 |

Note.—Unstabilized 2 hours.

Results similar to those reported in Table III and IV are obtained when the antioxidants of Table II are employed together with the indicated secondary antioxidants and ultraviolet absorbers.

| Product | Secondary antioxidant | UV absorber |
|---|---|---|
| L | DSTDP | 2-(3'-t-butyl-2'-hydroxy-5-methylphenyl)-5-chloro-benzotriazole. |
| M | DLTDP [1] | 2-hydroxy-4-n-octyloxy-benzophenone. |
| N | Tris-nonylphenylphosphite | 4-dodecyloxy-2-hydroxy-benzophenone. |
| O | Trilauryl trithiophosphite | 4-t-octylphenyl salicylate. |
| P | DLTDP | Phenylsalicylate. |
| Q | DLTDP | 4-t-butylphenyl salicylate. |
| R | Tris-nonylphenylphosphite | 2,4-dihydroxybenzophenone. |
| S | DSTDP | 2-hydroxy-4-methoxybenzophenone. |
| T | Trilauryl trithiophosphite | 5-chloro-2-hydroxy-benzophenone. |
| U | DSTDP | 4-t-octylphenyl salicylate. |

[1] DLTDP=dilaurylthiodipropionate.

It should be noted that in all above examples of stabilizing compositions the use of a secondary antioxidant and an ultraviolet absorber is optional. However, for best results, said additives should be employed in conjunction with the antioxidants of this invention, especially the secondary antioxidant. These additional additives may be used in the amount of from about 0.05 to about 5% each, and preferably from about 0.1 to about 2% by weight of the substrate.

Besides activity in the oven ageing test, the novel antioxidants of the present invention are characterized by excellent color values (no discoloration during the oven ageing test) and good gas fading properties.

The present antioxidants are useful in protecting synthetic polymers such as polypropylene against oxidation in air, thermal degradation or deterioration by including in such substances, a stabilizing agent of the antioxidant which will vary between about 0.01 and 5% and preferably, from about 0.05 to about 1.0% by weight. The antioxidant can be incorporated into the synthetic polymers using conventional procedures. For example, the antioxidants of the present invention are incorporated into the material to be stabilized by any suitable means such as by milling the antioxidant on hot or cold mill rolls, by mixing it in by the use of a Banbury mixer or other well-known devices of this nature or the antioxidant may be mixed with a polyolefin material in the form of molding powder and incorporated during extrusion or prior to extrusion or during injection molding. The antioxidant may even be incorporated into a solution of the polyolefin material and the solution may then be employed for the formation of films, for wet or dry spinning of fibers, monofilament and the like.

The examples set out above are to be considered as illustrative of the present invention and are not to be considered as restrictive. It is therefore to be understood that the invention is not limited to the specific embodiments set out above except as defined in the appended claims.

What is claimed is:

1. A compound of the formula:

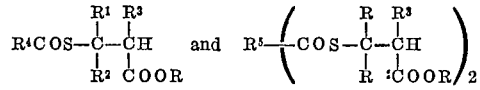

wherein

—R is

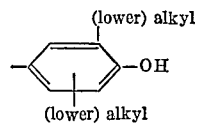

—$R^1$, —$R^2$, —$R^3$ are each hydrogen, lower alkyl having up to 6 carbon atoms, phenyl or —$C_mH_{2m}COOR$, where $m$ is 0 or 1, is straight or branched alkyl having up to 24 carbon atoms, phenyl, naphthyl, benzyl, diphenylmethyl or R and is —$C_nH_{2n}$— wherein $n$ is 0 to 12 or —$C_6H_4$.

2. A compound according to claim 1 wherein —R is

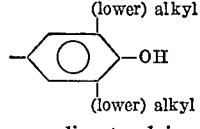

3. A compound according to claim 1 wherein R is 3,5-di-t-butyl-4-hydroxyphenyl group, $R^1$ is hydrogen, $R^2$ and $R^3$ are hydrogen or —$C_mH_{2m}$—COOR where $m$ is 0 or 1, $R^4$ is lower alkyl, phenyl or benzyl and $R^5$ is phenylene.

4. A compound according to claim 1 wherein $R^1$, $R^2$ and $R^3$ are hydrogen, $R^4$ is methyl and R is 3,5-di-t-butyl-4-hydroxyphenyl.

5. A compound according to claim 1 wherein $R^1$, $R^2$ and $R^3$ are hydrogen, $R^4$ is diphenylmethyl and R is 3,5-di-t-butyl-4-hydroxyphenyl.

6. A compound according to claim 1 wherein $R^1$ and $R^3$ are hydrogen, $R^2$ is —COOR, $R^4$ is methyl and R is 3,5-di-t-butyl-4-hydroxyphenyl.

7. A compound according to claim 1 wherein $R^1$ and $R^3$ are hydrogen, $R^2$ is —COOR, $R^4$ is ethyl and R is 3,5-di-t-butyl-4-hydroxyphenyl.

8. A compound according to claim 1 wherein $R^1$ and $R^2$ are hydrogen, $R^3$ is —$CH_2$COOR, $R^4$ is ethyl and R is 3,5-di-t-butyl-4-hydroxyphenyl.

9. A compound according to claim 1 wherein $R^1$ and $R^3$ are hydrogen, $R^2$ is —COOR, $R^4$ is phenyl and R is 3,5-di-t-butyl-4-hydroxyphenyl.

10. A compound according to claim 1 wherein $R^1$ and $R^2$ are hydrogen, $R^3$ is —$CH_2$COOR, $R^4$ is phenyl and R is 3,5-di-t-butyl-4-hydroxyphenyl.

11. A compound according to claim 1 wherein $R^1$, $R^2$ and $R^3$ are hydrogen, $R^5$ is phenylene and R is 3,5-di-t-butyl-4-hydroxyphenyl.

12. A compound according to claim 1 wherein $R^1$ and $R^3$ are hydrogen, $R^2$ is —COOR, $R^4$ is diphenylmethyl and R is 3,5-di-t-butyl-4-hydroxyphenyl.

13. A compound according to claim 1 wherein $R^1$ and $R^3$ are hydrogen, $R^2$ is —COOR, $R^5$ is phenylene and R is 3,5-di-t-butyl-4-hydroxyphenyl.

14. A compound according to claim 1 wherein $R^1$ and $R^2$ are hydrogen, $R^3$ is —$CH_2$COOR, $R^5$ is phenylene and R is 3,5-di-t-butyl-4-hydroxyphenyl.

References Cited

UNITED STATES PATENTS

| | | | |
|---|---|---|---|
| 2,423,641 | 7/1947 | Ellingboe | 260—455 |
| 2,630,448 | 3/1953 | Crouch et al. | 260—455 |
| 3,116,305 | 12/1963 | Morris et al. | 260—410.5 |
| 3,369,979 | 2/1968 | Oswald et al. | 260—455 |
| 3,385,899 | 5/1968 | Weil et al. | 260—455 |
| 3,457,328 | 7/1969 | Blatz et al. | 260—479 |
| 3,522,313 | 7/1970 | Reece et al. | 260—455 |

FOREIGN PATENTS

| | | | |
|---|---|---|---|
| 6,332 | 3/1967 | Japan | 260—455 |

LEWIS GOTTS, Primary Examiner

G. HOLLRAH, Assistant Examiner

U.S. Cl. X.R.

99—163; 252—48.6, 406, 407; 260—45.85, 212, 398.5, 666.5

UNITED STATES PATENT OFFICE
CERTIFICATE OF CORRECTION

Patent No. 3,636,033          Dated January 18, 1972

Inventor(s) Eduard K. Kleiner

It is certified that error appears in the above-identified patent and that said Letters Patent are hereby corrected as shown below:

Table II, line 2, "$CH_2(CH_2COSH$" should read ---$CH_3(CH_2)_7COSH$---.

Column 8, Claim 1, the portion of the formula

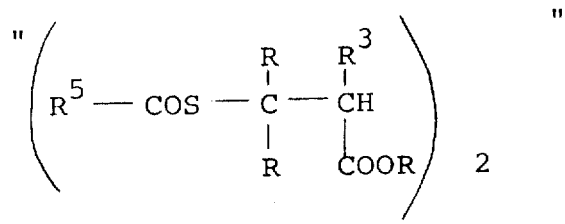

should read

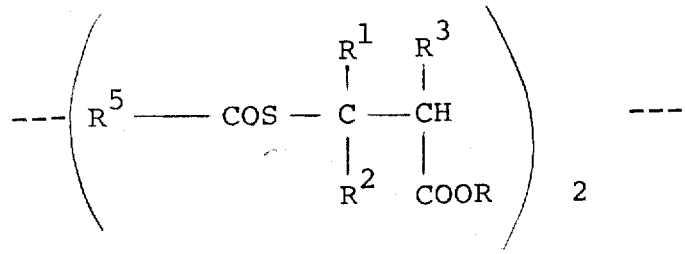

Signed and sealed this 5th day of September 1972.

(SEAL)
Attest:

EDWARD M. FLETCHER, JR.
Attesting Officer

ROBERT GOTTSCHALK
Commissioner of Patents